(12) United States Patent
Euvino, Jr. et al.

(10) Patent No.: US 8,366,047 B2
(45) Date of Patent: Feb. 5, 2013

(54) ELECTROTHERMAL INLET ICE PROTECTION SYSTEM

(75) Inventors: Frank J. Euvino, Jr., Naugatuck, CT (US); Anthony J. Vinciquerra, Niskayuna, NY (US)

(73) Assignee: United Technologies Corporation, Hartford, CT (US)

( * ) Notice: Subject to any disclaimer, the term of this patent is extended or adjusted under 35 U.S.C. 154(b) by 2005 days.

(21) Appl. No.: 11/140,790

(22) Filed: May 31, 2005

(65) Prior Publication Data
US 2006/0280600 A1 Dec. 14, 2006

(51) Int. Cl.
*B64D 15/12* (2006.01)
(52) U.S. Cl. ............. 244/134 D; 244/134 R; 60/39.093
(58) Field of Classification Search .............. 244/134 R, 244/134 D, 134 E, 53 B; 60/39.093; 415/175; 416/96 A
See application file for complete search history.

(56) References Cited

U.S. PATENT DOCUMENTS

| | | | | |
|---|---|---|---|---|
| 2,469,375 A * | 5/1949 | Flagle | ............................... | 415/47 |
| 2,540,472 A * | 2/1951 | Boyd et al. | ..................... | 219/201 |
| 2,594,118 A * | 4/1952 | Boyd | ......................... | 244/134 R |
| 2,655,308 A * | 10/1953 | Luttman | ........................ | 415/177 |
| 2,672,281 A * | 3/1954 | Redding | ....................... | 415/58.1 |
| 2,764,390 A * | 9/1956 | Harris, Jr. | ......................... | 55/306 |
| 2,800,273 A * | 7/1957 | Wheatley et al. | ............. | 184/6.11 |
| 2,806,350 A * | 9/1957 | Hoffmann | ....................... | 60/793 |
| 2,869,535 A * | 1/1959 | Horrell | ...................... | 126/110 R |
| 2,997,229 A * | 8/1961 | Quan et al. | .................. | 415/208.1 |
| 3,057,154 A * | 10/1962 | Sherlaw et al. | ............. | 60/39.093 |
| 3,057,597 A * | 10/1962 | Meyer, Jr. et al. | ........... | 416/90 R |
| 3,116,789 A * | 1/1964 | Kent | ............................... | 165/147 |
| 3,269,700 A * | 8/1966 | Shainess | ......................... | 416/95 |
| 3,341,114 A * | 9/1967 | Larson | ........................... | 415/175 |
| 3,981,466 A * | 9/1976 | Shah | ......................... | 244/134 R |
| 5,029,440 A * | 7/1991 | Graber et al. | .............. | 60/39.093 |
| 5,043,558 A * | 8/1991 | Byles | ............................. | 219/201 |
| 5,085,559 A * | 2/1992 | Stoffer et al. | ................... | 416/95 |
| 5,220,785 A * | 6/1993 | Miller | ......................... | 60/39.093 |
| 5,281,091 A * | 1/1994 | Dooley et al. | ................ | 415/178 |
| 5,328,331 A * | 7/1994 | Bunker et al. | .............. | 416/96 R |
| 5,525,035 A | 6/1996 | Ben-Porat et al. | | |
| 5,558,495 A * | 9/1996 | Parker et al. | .................... | 416/95 |
| 5,605,441 A * | 2/1997 | Boszor et al. | ................. | 415/200 |
| 5,623,821 A * | 4/1997 | Bouiller et al. | ............ | 60/39.093 |

(Continued)

FOREIGN PATENT DOCUMENTS

DE 826412 1/1952
EP 298898 1/1989

(Continued)

OTHER PUBLICATIONS

European Search Report dated Aug. 27, 2009.

*Primary Examiner* — Benjamin P Lee
(74) *Attorney, Agent, or Firm* — Carlson, Gaskey & Olds PC

(57) ABSTRACT

A modular fan inlet ice protection system includes a center ring, an outer ring and a plurality of struts. The struts are each coupled at a first end to the center ring, and at a second end to the outer ring. A plurality of shell members are each configured to be removably coupled to a corresponding strut. Moreover, the shell members each include an electrothermal heater element. Preferably the system further includes a plurality of inlet guide vanes each including an electrothermal heater element.

7 Claims, 2 Drawing Sheets

U.S. PATENT DOCUMENTS

| | | | | |
|---|---|---|---|---|
| 5,947,418 A * | 9/1999 | Bessiere et al. | ........... | 244/134 D |
| 5,971,323 A * | 10/1999 | Rauch et al. | ............... | 244/134 D |
| 6,145,787 A * | 11/2000 | Rolls | ........................ | 244/134 R |
| 6,279,856 B1 * | 8/2001 | Rutherford et al. | ........ | 244/134 E |
| 6,322,322 B1 * | 11/2001 | Rhodes et al. | ................. | 415/191 |
| 6,442,944 B1 * | 9/2002 | Skur, III | .......................... | 60/782 |
| 7,070,386 B2 * | 7/2006 | Kessler et al. | ................ | 415/115 |
| 7,080,971 B2 * | 7/2006 | Wilson et al. | .................. | 416/92 |
| 2004/0042902 A1 * | 3/2004 | Hornick et al. | ................ | 416/189 |
| 2004/0065092 A1 * | 4/2004 | Wadia et al. | .................... | 60/778 |
| 2005/0008482 A1 | 1/2005 | Allford et al. | | |
| 2007/0075188 A1 * | 4/2007 | Stoner et al. | ............. | 244/134 D |

FOREIGN PATENT DOCUMENTS

| | | |
|---|---|---|
| GB | 697006 | 9/1953 |
| GB | 1500013 | 2/1978 |

* cited by examiner

ELECTROTHERMAL INLET ICE PROTECTION SYSTEM

This invention was made with Government support under N00019-02-C-3003 awarded by the United States Navy. The Government has certain rights in this invention.

FIELD OF THE INVENTION

This invention relates generally to deicing systems for aircraft engines, and more particularly to an electrothermal inlet ice protection system.

BACKGROUND OF THE INVENTION

Fan module components are protected from ice accretion using hot air bled from the high compressor. Hot air is supplied via a manifold into hollow cavities in the fan inlet case struts, thereby heating the struts and nose cone. Ultimately, this air is channeled through a series of ultrasonically drilled holes (approximately 200 per strut) to produce a hot air film on the pressure side of an inlet guide vane. This system not only taps into engine performance, but also has severely limited capability in organic matrix composite applications.

Current organic matrix composite materials capable of producing fan inlet cases are limited to maximum use temperatures of 350° F. Compressor discharge air can be significantly hotter than this limit, depending on engine speed. At ground idle, where the compressor discharge air temperature is relatively low (in icing conditions), flowing the required volume of air to anti-ice an inlet guide vane is not possible because of the limitations of the tortuous path within the inlet case manifold, struts, plumbing and valves. At maximum power, the air temperature is significantly higher, and therefore necessitates a reduction in flow so as to avoid overheating the inlet case. This reduction in flow is substantial enough to cool the hot air to a temperature too low to effectively anti-ice an inlet guide vane. Modulation has been considered and analyzed where fan discharge air would be mixed with the hotter air. This, however, has not produced satisfactory results in all cases.

Metallic inlet cases also have limitations. Erosion coatings, necessary in certain applications, have maximum use temperature limits of 450° F. Deicing can occur for more of the specified range, but the cost in performance and weight is still prohibitive.

Accordingly, it is an object of the present invention to provide an ice protection system that overcomes the above-mentioned drawbacks and disadvantages.

SUMMARY OF THE INVENTION

A modular fan inlet ice protection system comprises a center ring, an outer ring and a plurality of struts. The struts are each coupled at a first end to the center ring, and at a second end to the outer ring. A plurality of shell members are each configured to be removably coupled to a corresponding strut. Moreover, the shell members each include an electrothermal heater element. Preferably the system further comprises a plurality of inlet guide vanes each including an electrothermal heater element.

DETAILED DESCRIPTION OF THE PREFERRED EMBODIMENTS

Figure 2:
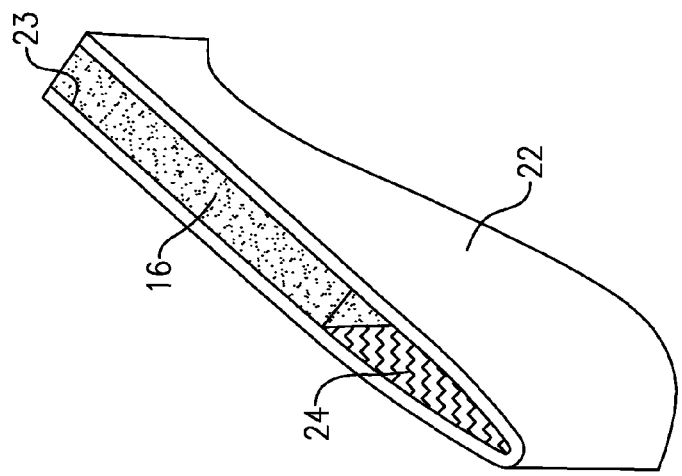
FIG. 2 is an enlarged perspective view of a strut/shell of the modular fan inlet case of FIG. 1 incorporating electrothermal heater elements.
Figure 1:
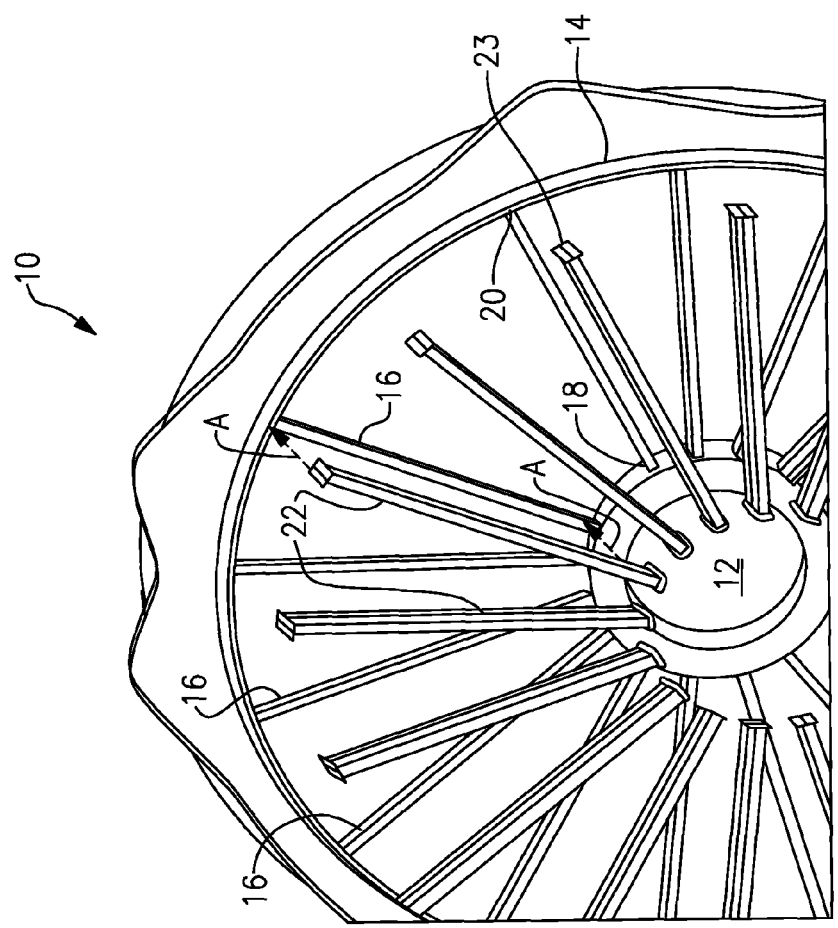
FIG. 1 is a perspective view of a modular fan inlet case incorporating an electrothermal ice protection system in accordance with the present invention.

With reference to FIGS. 1 and 2, a modular fan inlet ice protection system embodying the present invention is generally indicated by the reference number 10. The system 10 provides a reliable, low cost means to anti/deice an engine fan inlet case and inlet guide vanes that is better suited for use with organic matrix composite materials than with conventional bleed air systems.

The system 10 comprises a center ring 12, an outer ring 14 and a plurality of struts 16 each preferably fabricated at least in part from an organic matrix composite. The struts 16 are each coupled at a first end 18 to the center ring and at a second end 20 to the outer ring to thereby form a structural ring-strut-ring inlet case component.

A structural ring-strut-ring inlet case component, housing a bearing compartment, a forward engine attachment to an airframe, and attachment of fan inlet guide vanes is manufactured using low cost lightweight methods such as, for example, organic matrix composite, resin transfer molding. A plurality of shell members 22 are preferably fabricated at least in part from an organic matrix composite. The shell members 22 are each configured to be removably coupled to a corresponding strut 16 to form aerodynamic surfaces on the struts. For example, the shell members 22 each define a longitudinal groove 23 which is placed over a corresponding strut 16 (as shown by arrows A-A in FIG. 1) to removably couple the shell member to the strut. The shell members 22 can be easily replaced if damaged, worn, aero/structural iteration of the module occurs, or other performance factors change. The center ring 12, outer ring 14 and the plurality of struts 16 serve as a structural backbone to the modular fan inlet ice protection system 10 and generally remain unchanged. The system 10, however, allows for easy replacement of the shell members 22 when damaged or worn without major disassembly of the system.

The present invention allows the modular fan inlet ice protection system 10, in which the majority of the cost is associated, to be out of the environment that will cause erosion or foreign object damage events to occur. The shell members 22 can be designed to suit requirements such as: inexpensive replaceable components, for a system design and development phase where aero or performance changes are likely, or full life components, in a learned out production environment. The modular design also allows for tailoring performance for different customers, missions, or foreign sales as appropriate.

As shown in FIG. 2, the shell members 22 each include co-molded electrothermal heater elements 24. The electrothermal heater elements 24 are preferably connected via a wire harness to a control system (not shown) that cycles the system on/off as required by conventional deicing logic (not shown) similar to that used for deicing airplane wings. For a seventeen strut inlet case, for example, six independent zones are preferable, each powering sectors of three struts 16 or, alternatively, two struts and the nose cone (not shown). This zoning configuration allows for much lower power requirements, with no adverse affect on ice protection capability.

Figure 4:
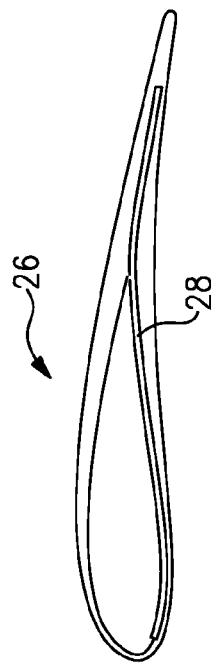
FIG. 4 is a cross-sectional end view of the inlet guide vane of FIG. 3 taken along line 4-4.
Figure 3:
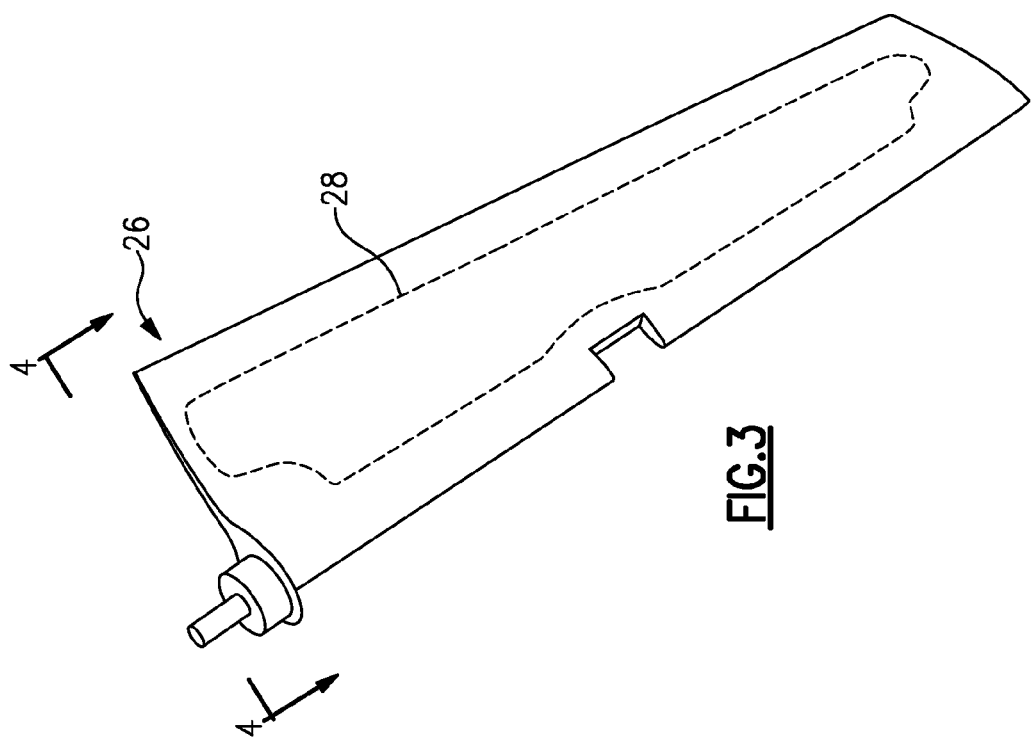
FIG. 3 is a perspective view of an inlet guide vane incorporating electrothermal heater elements in accordance with the present invention.

With reference to FIGS. 3 and 4, the system 10 preferably further comprises inlet guide vanes 26 (one shown) including electrothermal heater elements 28 co-molded within a laminate. The inlet guide vanes 26 are preferably fabricated at least in part from an organic matrix composite. Operated from the same control system with respect to the above-mentioned zoning configuration, the system 10 offers many advantages over prior ice protection systems as explained below.

For example, it has been discovered that sufficiently warm surface temperatures to anti/deice a modular fan inlet case can be achieved with electrothermal heating systems without violating the limits of the composite materials comprising the fan inlet case. Additionally, significant weight savings is realized with a system in accordance with the present invention. Hot air systems, with their necessary plumbing, valves and manifold, can be approximately thirty pounds heavier than an electrothermal system replacement. If modulation is necessary, the weight savings can approach fifty pounds.

Damage tolerance is also an improvement over prior ice protection systems. In prior hot air systems, if a strut is damaged to the point where ice protection hot air is lost, the entire system is compromised. Conversely, damage to a single electrothermally heated strut in accordance with the present invention only affects that particular strut. Furthermore, redundancy can be designed into the electrothermal heater elements whereby damage only affects a portion of a strut, or parallel systems can offset entirely the effects of the damaged zone.

Another advantage of the present invention is the ability for easy tailoring of the system to meet customer needs. Changes to requirements can be handled with less change to the overall system as compared to a hot air system.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

What is claimed is:

1. A modular fan inlet ice protection system, comprising:
   a center ring;
   an outer ring;
   a plurality of struts each coupled at a first end to the center ring, and at a second end to the outer ring;
   a plurality of shell members, each shell member being configured to be removably coupled to a corresponding strut, and each shell member including an electrothermal heater element.

2. A modular fan inlet ice protection system as defined in claim 1, further comprising a plurality of inlet guide vanes each including an electrothermal heater element.

3. A modular fan inlet ice protection system as defined in claim 1, wherein the plurality of shell members each define a longitudinal groove for being received onto a corresponding strut.

4. A modular fan inlet ice protection system as defined in claim 1, wherein the center ring is fabricated at least in part from an organic matrix composite.

5. A modular fan inlet ice protection system as defined in claim 1, wherein the outer ring is fabricated at least in part from an organic matrix composite.

6. A modular fan inlet ice protection system as defined in claim 1, wherein the plurality of struts are each fabricated at least in part from an organic matrix composite.

7. A modular fan inlet ice protection system as defined in claim 1, wherein the plurality of shell members are each fabricated at least in part from an organic matrix composite.

* * * * *